United States Patent [19]

Schwindeman et al.

[11] Patent Number: 5,708,092

[45] Date of Patent: Jan. 13, 1998

[54] FUNCTIONALIZED CHAIN EXTENDED INITIATORS FOR ANIONIC POLYMERIZATION

[75] Inventors: James A. Schwindeman, Lincolnton; Conrad W. Kamienski; Robert C. Morrison, both of Gastonia, all of N.C.

[73] Assignee: FMC Corporation, Philadelphia, Pa.

[21] Appl. No.: 631,524

[22] Filed: Apr. 12, 1996

Related U.S. Application Data

[63] Continuation-in-part of Ser. No. 436,780, May 8, 1995, Pat. No. 5,565,526, which is a continuation-in-part of Ser. No. 245,578, May 13, 1994, abandoned.

[51] Int. Cl.$^6$ .............................. C08F 4/08; C08F 36/04; C07F 1/02

[52] U.S. Cl. .............................. 525/272; 525/90; 525/91; 525/98; 525/123; 525/126; 525/177; 525/184; 525/288; 525/292; 525/296; 525/298; 525/303; 525/309; 525/332.2; 525/332.3; 525/338; 525/343; 525/366; 525/370; 525/371; 525/383; 525/385; 525/388; 526/178; 526/180; 526/181; 526/340.2; 502/155; 502/156; 502/157; 260/665 R; 556/470; 556/482; 564/305; 564/509; 564/511; 568/583; 568/589; 568/626; 568/659; 568/687

[58] Field of Search .............................. 260/665 R; 556/470, 556/482; 502/155, 157, 156; 568/626, 659, 687, 583, 589; 525/123, 126, 177, 184, 288, 292, 296, 298, 272, 90, 91, 98, 303, 309, 332.2, 338, 343, 366, 371, 383, 385, 388; 526/178, 180, 181, 340.2; 564/305, 509, 511

[56] References Cited

U.S. PATENT DOCUMENTS

| | | | |
|---|---|---|---|
| 3,326,881 | 6/1967 | Uraneck et al. | 526/181 X |
| 3,862,100 | 1/1975 | Halasa et al. | 526/181 |
| 5,331,058 | 7/1994 | Shepherd et al. | 526/173 X |
| 5,376,745 | 12/1994 | Handlin, Jr. et al. | 526/178 |
| 5,565,526 | 10/1996 | Schwindeman et al. | 526/181 X |

*Primary Examiner*—Fred Teskin
*Attorney, Agent, or Firm*—Bell Seltzer; Intellectual Property Law Grop of Alston & Bird LLP

[57] ABSTRACT

A process for the preparation of hydrocarbon solutions of monofunctional ether initiators of the following general structure:

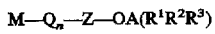

$$M-Q_n-Z-OA(R^1R^2R^3)$$

wherein M is defined as an alkali metal, selected from the group consisting of lithium, sodium and potassium, Q is a saturated or unsaturated hydrocarbyl group derived by incorporation of a compound selected from the group consisting of conjugated diene hydrocarbons and alkenylsubstituted aromatic hydrocarbons; Z is a branched or straight chain hydrocarbon group which contains 3-25 carbon atoms, optionally containing aryl or substituted aryl groups; A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and n is an integer from 1 to 5, monofunctional ethers produced by the process, use of the initiators in a polymerization process and polymers produced by the polymerization process.

47 Claims, No Drawings

FUNCTIONALIZED CHAIN EXTENDED INITIATORS FOR ANIONIC POLYMERIZATION

This application is a continuation-in-part of application Ser. No. 08/436,780 filed May 8, 1995, now U.S. Pat. No. 5,565,526, which is a continuation-in-part of application Ser. No. 08/242,518 filed May 13, 1994, now abandoned.

This invention concerns a process for the polymerization of olefinic-containing monomers, polymers produced by this process, novel anionic initiators for use in the polymerization process and a process for making the anionic initiators.

Useful polymeric products are obtained by polymerizing olefinic containing monomers in the presence of an organoalkali metal initiator and subsequently reacting the resulting polymer, containing an active alkali metal end group or groups, with a reagent which will couple the polymer molecules or replace the alkali metal with more stable reactive end groups.

Monofunctional silyl ether initiators, containing alkali metal end groups useful in effecting such polymerization reactions are disclosed in Great Britain published patent application 2,241,239, published Aug. 28, 1991. These monofunctional silyl ether initiators were demonstrated to be useful in producing polybutadienes having desirable characteristics such as a molecular weight of typically 1,000 to 10,000, 1,4 content of typically 90%, etc.

A co-pending U.S application No. 198,914, filed Feb. 18, 1994 (now abandoned) discloses a process for the preparation of hydrocarbon solutions of monofunctional ether initiators of the following general structure:

$$M\text{—}Z\text{—}O\text{—}C(R^1R^2R^3) \qquad (I)$$

wherein M is defined as an alkali metal, preferably lithium; Z is a branched or straight chain hydrocarbon group which contains 3–25 carbon atoms, optionally containing aryl or substituted aryl groups; and $R_1$, $R_2$, and $R_3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and their employment as initiators in the anionic polymerization of olefin containing monomers in an inert, hydrocarbon solvent optionally containing a Lewis base. The process reacts selected omega-protected-1-haloalkyls whose alkyl groups contain 3 to 25 carbon atoms, with lithium metal at a temperature between about 35° C. and about 130° C., preferably at the reflux temperature of an alkane or cycloalkane reaction solvent containing 5 to 10 carbon atoms and mixtures of such solvents.

Anionic polymerizations employing the monofunctional ether initiators are conducted in an inert solvent, preferably a non-polar solvent, optionally containing an ethereal modifier, using an olefinic monomer which is an alkenylaromatic or a 1,3-diene at a temperature of about −30° C. to about +60° C. The polymerization reaction proceeds from initiation to propagation and is finally terminated with appropriate reagents so that the polymer is monofunctionally or di-functionally terminated. The polymers may have a molecular weight range of about 1000 to 10,000 but the molecular weight can be higher. Typically 5 to 50 milli-moles of initiator is used per mole of monomer.

The precursor omega-protected 1-haloalkyls (halides) were prepared from the corresponding haloalcohol by the standard literature methods. For example, 3-(1,1-dimethylethoxy)-1-chloropropane was synthesized by the reaction of 3-chloro-1-propanol with 2-methylpropene according to the method of A. Alexakis, M. Gardette, and S. Colin, Tetrahedron Letters, 29, 1988, 2951. 6-(benzyloxy)-1-chlorohexane and the like were prepared from 6-chloro-1-hexanol and benzyl chloride, under phase transfer conditions, in keeping with the teachings of H. H. Freeman and R. A. Dubois, Tetrahedron Letters, 1975, 3251. The compound 4-(methoxy)-1-chlorobutane, and the higher analogs, were synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Monofunctional ether initiators prepared in accord with this earlier process can include, but are not limited to, 3-(1,1-dimethylethoxy)-1-propyllithium, 3-(1,1-dimethylpropoxy)-1-propyllithium, 5-(1,1-dimethylethoxy)-1-pentyllithium, 3-(1,1-dimethylethoxy)-2,2-dimethyl-1-propyllithium, 4-(1,1-dimethylethoxy)-1-butyllithium, 6-(1,1-dimethylethoxy)-1-hexyllithium, 8-(1,1-dimethylethoxy)-1-octyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino]-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy]-1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium. These monofunctional ether initiators have rather limited hydrocarbon solubility.

The present process provides monofunctional ether initiators with increased hydrocarbon solubility, a process for the production of these monofunctional ether initiators, an anionic polymerization process for polymerizing olefin containing monomers employing these new initiators and polymers produced by the new anionic polymerization process.

The monofunctional ether initiators, of this invention, having increased solubility in hydrocarbons are of the formula:

$$M\text{—}Q_n\text{—}Z\text{—}OA(R^1R^2R^3) \qquad (II)$$

wherein M is defined as an alkali metal, preferably lithium; Q is a saturated or unsaturated hydrocarbyl group derived by incorporation of a compound selected from the group consisting of conjugated diene hydrocarbons and alkenylsubstituted aromatic hydrocarbons; Z is a branched or straight chain hydrocarbon group which contains 3–25 carbon atoms, optionally containing aryl or substituted aryl groups; A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and n is an integer from 1 to 5.

The process aspect of this invention for producing the initiators of formula (II) reacts selected omega-protected-1-haloalkyls where the tether groups contain 3 to 25 carbon atoms, with an alkali metal, preferably lithium, at a temperature between about 35° C. and about 130° C., preferably at the solvent reflux temperature, to form a monofunctional lithium ether initiator (of formula I) which is then reacted with a conjugated diene hydrocarbon or a alkenylsubstituted aromatic hydrocarbon in an alkane or cycloalkane reaction solvent containing 5 to 10 carbon atoms and mixtures of such solvents to produce a monofunctional ether initiator with an extended chain or tether between the metal atom (M) and oxygen (O) in formula (II) above. Q in formula (II) is preferably derived from conjugated 1,3-dienes.

The alkali metal, preferably lithium, used in preparing the monofunctional ethers is used as a dispersion whose particle size usually does not exceed about 300 microns. Preferably the particle size is between 10 and 300 microns although coarser particle size lithium can be used. The lithium metal can contain 0.2 to 0.8 and preferably 0.3 to 0.5 weight percent sodium. The lithium metal is used in amounts of 90% of theoretical to a 40% excess above the theoretical amount necessary to produce the monofunctional alkali metal ether initiators.

The olefinic monomers used in producing the initiators are chosen from the group, of unsaturated organic compounds that can be polymerized anionically in a reaction initiated by an alkali metal or its carbanionic derivative. These olefinic monomers include 1,3-butadiene, isoprene, 2,3-dimethyl-1,3-butadiene, 1,3-pentadiene (piperylene), 2-methyl-3-ethyl-1,3butadiene, 3-methyl-1,3-pentadiene, 1,3 hexadiene, 2,5-dimethyl-2,4-hexadiene and 1,3-octadiene. Among the dialkylbutadienes, it is preferred that the alkyl groups contain from 1 to 3 carbon atoms. Numerous other olefinic monomers are disclosed, for instance, in U.S. Pat. No 3,377,404. Polymerizable alkenyl-substituted aromatic compounds which can be anionically polymerized include styrene; alpha-methylstyrene; vinyltoluene, 1-vinylnaphthalene, 2-vinylnaphthalene, 1-alpha-methylvinylnaphthalene, 2-alpha-methylvinylnaphathalene, 1,2-diphenyl-4-methylhexene-1 and mixtures of these, as well as alkyl, cycloalkyl, aryl, alkaryl and aralkyl derivatives thereof in which the total number of carbon atoms in the combined hydrocarbon constituents is generally not greater than 12. Examples of these latter compounds include; 3-methylstyrene, 3,5-diethylstyrene, 2-ethyl-4-benzylstyrene, 4-phenylstyrene, 4-p-tolylstyrene, 2,4-divinyltoluene and 4,5-dimethyl-1-vinylnaphthalene. Again, reference is made to U.S. Pat. No. 3,377,404 for disclosures of additional vinyl-substituted aromatic compounds. Non-polymerizable alkenyl substituted aromatic compounds such as 1,1-diphenylethylene may also be used.

The process of the current invention for producing the initiators uses omega-protected-1-haloalkyls which include but are not limited to, 3-(1,1-dimethylethoxy)-1-propylhalide, 3-(1,1-dimethylpropoxy)-1-propylhalide, 4-(methoxy)-1-butylhalide, 3-(triphenylmethoxy)-1-propylhalide, 5-(triphenylmethoxy)-1-pentylhalide, 6-(triphenylmethoxy)-1-hexylhalide, 8-(triphenylmethoxy)-1-octylhalide 3-(1,1-dimethylethoxy)-2-methyl-1-prophalide, 3-[3-(dimethylamino)-1-propyloxy]-1-propylhalide, 3-[2-(dimethylamino)-1-ethoxy]-1-propylhalide, 3-[2-(diethylamino)-1-ethoxy]-1-propylhalide, 3-[2-(diisopropyl)amino]-1-ethoxy]-1-propylhalide, 3-[2-(1-piperidino)-1-ethoxy]-1-propylhalide, 3-[2-(1-pyrrolidino)-1-ethoxy]-1-propylhalide, 4-[3-(dimethylamino)-1-propyloxy]-1-butylhalide, 6-[2-(1-piperidino)-1-ethoxy]-1-hexylhalide, 3-[2-(methoxy)-1-ethoxy]-1-propylhalide, 3-[2-(ethoxy)-1-ethoxy]-1-propylhalide, 4-[2-(methoxy)-1-ethoxy]-1-butylhalide, 5-[2-(ethoxy)-1-ethoxy]-1-pentylhalide, 3-[3-(methylthio)-1-propyloxy]-1-propylhalide, 3-[4-(methylthio)-1-butyloxy]-1-propylhalide, 3-(methylthiomethoxy)-1-propylhalide, 6-[3-(methylthio)-1-propyloxy]-1-hexylhalide, 3-[4-(methoxy)-benzyloxy]-1-propylhalide, 3-[4-(1,1-dimethylethoxy)-benzyloxy]-1-propylhalide, 3-[2,4-(dimethoxy)-benzyloxy]-1-propylhalide, 8-[4-(methoxy)-benzyloxy]-1-octylhalide, 4-[4-(methylthio)benzyloxy]-1-butylhalide, 3-[4-(dimethylamino)-benzyloxy]-1-propylhalide, 6-[4-(dimethylamino)-benzyloxy]-1-hexylhalide, 3-(1,1-dimethylethoxy)-2,2-dimethyl-1-propylhalide, 6-(t-butyldimethylsilyloxy)-1-hexylhalide, 3-(t-butyldimethylsilyloxy)-2,2-dimethyl-1-propylhalide; 3-(t-butyldimethylsilyloxy)-1-propylhalide; 4-(t-butyldimethylsilyloxy)-1-butylhalide and 3-(trimethylsilyloxy)-2,2-dimethyl-1propylhalide. The halo- or halide group is selected from chlorine and bromine and most preferred is the chloro group. The reaction temperature is above 50° C., the reaction medium is a hydrocarbon solvent and the reaction is conducted in an inert atmosphere.

Conjugated diene hydrocarbons useful in practicing this invention include but are not limited to isoprene, 1,3-butadiene, piperylene (1,3pentadiene), 2,3-dimethyl-1,3-butadiene, 1,3-hexadiene, 2,4-hexadiene, 2,5-dimethyl-2,4-hexadiene and the like as described above. Alkenylsubstituted aromatic hydrocarbons useful in practicing this invention include but are not limited to styrene, alpha-methylstyrene, vinyltoluene, 1-vinylnapthalene, 3-methylstyrene, 4-methylstyrene, 1,1-diphenylethylene and the like as described above.

The present invention also provides a process for the anionic polymerization of olefinic-containing monomers comprising the steps of:

a) initiating polymerization of a conjugated polyene hydrocarbon such as conjugated diene hydrocarbon or an alkenylsubstituted aromatic hydrocarbon in a hydrocarbon or mixed hydrocarbon-polar solvent medium at a temperature of 10° C. to 70° C. with an initiator having the formula:

$$M—Q_n—Z—OA(R^1R^2R^3) \qquad (II)$$

wherein M is an alkali metal, Q is a saturated or unsaturated hydrocarbyl group derived by incorporation of a compound selected from the group consisting of conjugated diene hydrocarbons and alkenylsubstituted aromatic hydrocarbons; Z is a branched or straight chain hydrocarbon group which contains 3–25 carbon atoms, optionally containing aryl or substituted aryl groups; A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and n is an integer from 1 to 5; reacting the intermediate polymer with a reactive compound such as ethyene oxide, oxygen, sulfur, carbon dioxide, omega-alkenylarylhalosilanes such as styrenyldimethyl chlorosilane, chlorosilanes as exemplified by silicon tetrachloride and dimethyl dichlorosilane, and chlorostannanes as exemplified by tin tetrachloride and dibutyltin dichloride, isomeric divinylbenzenes and other materials known in the art to be useful for terminating, end capping or coupling of polymers; optionally hydrogenating the polymer; and b) recovering a linear or branched polymer having one or more terminal functional groups having the formula FG—(Q)x—Z—OA($R^1R^2R^3$) wherein FG is a functional group derived from reaction of the intermediate polymer with one of the selected reactive compounds described above and x is the number of units of conjugated diene or alkenylsubstituted aromatic hydrocarbon (including that employed originally to solubilize the initiator) and may vary from 10 to 200 c) further reacting the functional polymer with other comonomers such as diesters, diisocyanates, di- or cyclic amides, and diols in the presence of a strong acid catalyst to simultaneously deprotect the functional polymer and polymerize both functional ends thereof to produce novel segmented block polymers, or d) further reacting the functional polymer with other comonomers in the absence of a strong acid catalyst to yield block copolymers, while maintaining the integrity of the protective group, or e) further removing the protective group and polymerizing the resultant functional block polymer from d) above with the same or other comonomers to produce novel segmented block polymers.

The inert solvent is preferably a non-polar solvent such as a hydrocarbon, since anionic polymerization in the presence of such non-polar solvents is known to produce polyenes with high 1,4-contents from 1,3-dienes. Preferred solvents are aliphatic and cycloalipliatic hydrocarbons having from 3 to 12, preferably from 4 to 8, carbon atoms. Examples of suitable hydrocarbons are hexane, cyclohexane, toluene and benzene. Alkanes or cycloalkanes are the most preferred solvents. Ethereal solvents can be added to the polymerization reaction to modify the microstructure of the resulting polymer, i.e., increase the proportion of 1,2 (vinyl) microstructure or to promote functionalization.

The olefinic monomer to be anionically polymerized is preferably an alkenylaromatic or a 1,3-diene. The alkenylaromatic or 1,3-diene will be chosen from the group of unsaturated organic compounds that can be polymerized anionically (i.e. in a reaction initiated by an organo- alkali metal). Suitable alkenylaromatics include the optionally-substituted styrenes and vinylnaphthalenes. Suitable 1,3-dienes will preferably contain from 4 to 12, especially from 4 to 8, carbon atoms per molecule. Examples of these compounds include the following: 1,3-butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3octadiene, 2,4-diethyl-1,3-butadiene, 2,3-di-n-propyl-1,3-butadiene, and 2-methyl-3-isopropyl-1,3-butadiene.

Among the dialkylbutadienes, it is preferred that the alkyl groups contain from 1 to 3 carbon atoms. Of the above monomers 1,3-butadiene, isoprene, 2,3-dimethyl-1,3-butadiene and 1,3-pentadiene are preferred with 1,3-butadiene being particularly preferred. The dienes may be polymerised alone, or in admixture with each other or with alkenylaromatic compounds to form random copolymers, or by charging the dienes to the reaction mixture sequentially, either with each other or with alkenylaromatic compounds, to form block copolymers.

For example, a protected functional living polymer of this invention can be generated by polymerizing 1,3-butadiene with an initiator of formula II above, wherein M is lithium, Z is a trimethylene tether group, Q is isoprene, n is 3, and $R^1$, $R^2$, and $R^3$ are methyl groups. A living polymer is produced having the formula

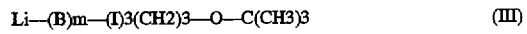

$$\text{Li—(B)m—(I)3(CH2)3—O—C(CH3)3} \qquad \text{(III)}$$

where B is a unit derived by polymerizing butadiene, m is an integer from about 10 to 200, and I is a unit derived by polymerization of isoprene. The living polymer III, may be reacted, for example, with ethylene oxide to yield, after hydrolysis, the compound of formula

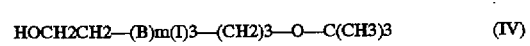

$$\text{HOCH2CH2—(B)m(I)3—(CH2)3—O—C(CH3)3} \qquad \text{(IV)}$$

which may optionally be hydrogenated to the corresponding asymmetric polymer.

Additionally, other asymmetrically monofunctional polymers may be produced by reacting the living polymer (III) above with, for example, carbon dioxide to produce, a polymer with one protected hydroxyl and one carboxyl group, or the living polymer III may be reacted with 1,5 diazabicyclo-(3.1.0) hexane as described in U.S. Pat. No. 4,753,991 to produce a polymer with one protected hydroxyl and one amino group.

Other asymmetrically substituted monofunctional polymers may be produced having epoxy or isocyanate groups at one end for example by reacting the lithium salt of IV above (before hydrolysis), with epichlorohydrin or, by reacting IV itself with an equivalent of a diisocyanate, such as methylene 4,4-diphenyl diisocyante (2/1 NCO/OH). These unsymmetrically substituted monofunctional polymers could then be further reacted with other comonomers either with or without simultaneous deprotection as described below.

The protected monohydroxy polymers (IV) alone and in their hydrogenated forms, could be used as base materials to lend flexibility and higher impact strength in a number of formulas to produce coatings, sealants, binders and block copolymers with polyesters, polyamides and polycarbonates as described in UK Patent Application GB2)70317A and in "Polytail" data sheets and brochures (Mitsubishi Kasei America).

Thus, in the presence of acidic catalysts used to promote the formation of many of these block copolymer resins, the protective group of the hydrogenated polymer is removed as well, allowing the exposed hydroxyl grouping in the base polymer molecule to simultaneously participate in the block copolymer reaction.

Thus, for example, hydrogenated IV polymers may be reacted with bisphenol A and phosgene in the presence of appropriate catalysts with simultaneous deprotection to yield a polycarbonate alternating block copolymer. The resulting products are useful as molding resins, for example, to prepare interior components for automobiles.

A segmented polyamide-hydrogenated IV block copolymer is also useful as a molding composition to prepare exterior automotive components that can be prepared by reacting hydrogenated IV polymer with caprolactam and adipic acid in the presence of a suitable catalyst.

A segmented polyester-hydrogenated IV block copolymer is produced by reaction of hydrogenated IV polymer with dimethyl terephthalate and a suitable acidic catalyst. Again, the products are useful as molding compounds for exterior automotive components.

Isocyanate-terminated prepolymers can be produced from hydrogenated IV polymers by reaction with suitable diisocyanates (2/1 NCO/OH) as above and which can be further reacted with diols and additional diisocyanates to form segmented polyurethanes useful for water based, low VOC coatings. Or segmented polyurethane prepolymers may be mixed with tackifying resins and used as a moisture-curable sealant, caulk or coating.

An acrylate-terminated prepolymer curable by free-radical processes can be prepared from the hydrogenated IV polymer by reaction with a diisocyanate (2NCO/OH) followed by further reaction with hydroxyethyl acrylate in the presence of a basic reagent.

Alternatively, the protected monohydroxy terminated polymer (IV) may be reacted with functional comonomers, without simultaneously removing the protective group, to produce novel copolymers. These copolymers then may be deprotected and then further reacted with the same or different comonomers to form yet other novel copolymers. Thus, for example, the hydroxyterminated polymer of formula (IV) may be hydrogenated, and then reacted with ethylene oxide in the presence of potassium tert-butoxide to produce a poly(ethleneoxide)-hydrogenated polybutadiene copolymer with one protected hydroxyl group on the polybutadiene segment. This hydroxyl can then be deprotected and a poly(ethyleneoxide) polymer having different chain lengths grown onto both ends of the polybutadiene segment.

These processes can be applied to the deprotected and optionally hydrogenated polymers of formula IV, as well. Thus, alternatively, the protective group could be removed first from the hydrogenated polymer, and then the block copolymers formed by addition of the appropriate comonomers.

In another possible application, the living polymer III may be reacted with an alkenylarylhalosilane such as styrenyldimethylchlorosilane to yield the corresponding omega-styrenylterminated macromonomer according to directions in U.S. Pat. No. 5,278,244 which may then be further polymerized by a variety of techniques to yield "comb" polymers which, on deprotection and hydrogenation yield branched polymers with hydroxyfunctionality on the branch-ends. Such multi-functionality can be utilized to graft a water-soluble polymer such as polyethylene oxide onto a hydrophobic polyolefinic core to produce hydrogels.

In still another example, a living polymer analogous to III having the formula

where B is polymerized butadiene, S is polymerized styrene and x and y can vary from 10 to 1000 or more is reacted with divinylbenzene (DVB) to produce a multi-armed star polymer, according to U.S. Pat. No. 4,409,357 which on hydrogenation and deprotection would yield a star with hydroxy-functional branches which also may be further reacted with ethylene oxide and potassium alkoxide as described above to produce hydrogels.

In still another possible application, the hydrogenated hydroxyterminated branches of the star polymer may be further reacted with acryloyl chloride or methacryloyl chloride, and the resultant acrylate or methacrylate-terminated polymer further polymerized with monomers selected from the group of alkyl acrylates, alkyl methacrylates, and dialkylacrylamides to produce hydrogels.

Star polymers are useful as viscosity index improver for motor oils.

Other monomers may be reacted directly with formula III type monofunctional compounds to yield block or star copolymers.

The following examples further illustrate the invention.

EXAMPLE 1

Preparation of 3-(1,1-Dimethylethoxy)-1-propyllithium Chain Extended with 2 Moles of Isoprene Lot 8976 (461-61)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.00 grams (0.720 mole, 2.80 equivalents) was transferred to the flask with 250 ml cyclohexane. This suspension was stirred at 450 RPMs, and heated to 63° C. with a heating mantle. The heat source was removed. 3-Chloro-1-(1,1-dimethylethoxy)propane, 38.73 grams (0.257 mole, 1.00 equivalent) was added dropwise. An exotherm was detected after 16% of the feed had been added. A dry ice/hexane cooling bath was applied to maintain the reaction temperature at 60°–65° C. The total feed time was sixty five minutes. An exotherm was noted until the last drop of feed was added, then the temperature fell off rapidly to room temperature. The reaction mixture was stirred at room temperature for forty minutes, then heated to 55° C. with a heating mantle. The heat source was removed. Isoprene, 35.05 grams (0.515 mole, 2.00 equivalents) was then added dropwise. An exotherm was noted after 34% of the feed had been added. Hexane cooling was applied to maintain the reaction temperature at 50°–55° C. The total isoprene feed time was forty two minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded a pale yellow, clear solution, yield=480 ml, 381.50 grams.
Total base=16.4 wt. %.
Active C-Li=15.7 wt %.
Yield (based on active C-Li)=90.3%.

An 85.22 gram sample of the 3-(1,1-dimethylethoxy)-1-propyllithium, chain extended with 2 moles of isoprene, Lot 8976, (total base=16.4%, Active C-Li=15.7%), was transferred to a dry 250 ml round bottom flask. This solution was concentrated in a rotary evaporator. This afforded a slightly viscous, clear, orange oil, yield=24.99 grams.
Total base=56.3 wt %
Active C-Li=53.6 wt %

Comparative Example

Preparation of 3-(1,1-Dimethylethoxy)-1-propyllithium Lot 8888 (461-27)

A 500 ml, three-necked Morton flask was equipped with a mechanical stirrer, a 125 ml, pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 4.07 grams (0.586 mole, 2.80 equivalents) was transferred to the flask with 150 ml cyclohexane. This suspension was stirred at 450 RPMs, and heated to 70° C. with a heating mantle. The heat source was removed. 3-Chloro-1-(1,1-dimethylethoxy)propane, 31.52 grams (0.209 mole, 1.00 equivalent) was added dropwise. An exotherm was detected after 5.5% of the feed had been added. A dry ice/hexane cooling bath was applied to maintain the reaction temperature at 60°–65° C. The total feed time was fifty-two minutes. An exotherm was noted until the last drop of feed was added, then the temperature fell off rapidly to room temperature. The reaction mixture was allowed to stir at room temperature for three and a half hours, then transferred to a small pressure filter with argon pressure. Very rapid filtration was observed with 2 psi argon. The muds were reslurried with cyclohexane (2×50 ml). This afforded a pale yellow, hazy solution, yield=230 ml, 185.03 grams.

Total base=3.85 wt.%
Active C-Li=3.78 wt %
Yield (based on active C-Li)=27.4%

A one milliliter aliquot of this solution was withdrawn, cooled to 0° C., and carefully quenched with water. The organic layer was then analyzed by gas chromotography. A Perkin Elmer Autosystem CC, equipped with a 30 meter, 0.53 mm AT-1 column, was employed for this analysis. All the 3-chloro-1-(1,1-dimethylethoxy)propane had been consumed, with the formation of a single, lower boiling compound, identified as 1-(1,1dimethylethoxy)propane.

This comparison example is a repeat of Example 1 except that no isoprene was added to the reaction. The product of Example 1 was more soluble in cyclohexane then was the product of the comparison example to which no isoprene was added. It is surprising that the active carbon-lithium of Example 1 was 15.7 weight percent while the comparison was only 3.78 weight percent.

Example 2

Preparation of 3-(1,1-Dimethylethoxy)-2,2-dimethyl-1-propyllithium Chain Extended with 2 Moles of Isoprene Lot 8977 (461-63)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.10 grams (0.735 mole, 2.80 equivalents) was transferred to the flask with 250 ml cyclohexane. This suspension was stirred at 450 RPMs, and heated to 65° C. with a heating mantle. The heat source was removed. 3-Chloro-2,2-dimethyl-1-(1,1-dimethylethoxy)propane, 45.44 grams (0.254 mole, 1.00 equivalent) was added dropwise. An exotherm was detected after 10.7% of the feed had been added. A dry ice/hexane cooling bath was applied to maintain the reaction temperature at 60°–65° C. The total feed time was sixty minutes. An exotherm was noted until the last drop of feed was added, then the temperature fell off rapidly to room temperature. The reaction mixture was stirred at room temperature for forty minutes, then heated to 65° C. with a heating mantle. The heat source was removed. Isoprene, 34.61 grams (0.508 mole, 2.00 equivalents) was then added dropwise. An exotherm was noted after 5.6% of the feed had been added. Hexane cooling was applied to maintain the reaction temperature at 60°–65° C. The total isoprene feed time was thirty minutes. The reaction mixture was allowed to stir at room temperature for one hour, then transferred to a small pressure filter with argon pressure. Very rapid filtration was observed with 2 psi argon. The muds were reslurried with cyclohexane (2×75 ml). This afforded a yellow, clear solution, yield=480 ml, 380.84 grams.

Total base=17.8 wt. %.
Active C-Li=16.9 wt %.
Yield (based on active C-Li)=88.6%.

Example 3

Preparation of 3-(t-Butyldimethylsilyloxy)-1-propyllithium Chain Extended with 2 Moles of Isoprene Lot 8983 (461-68)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.20 grams (0.749 mole, 2.80 equivalents) was transferred to the flask with 260 ml cyclohexane. This suspension was stirred at 450 RPMs, and heated to 65° C. with a heating mantle. The heat source was removed. 1-(t-Butyldimethylsilyloxy)-3-chloropropane, 58.82 grams (0.268 mole, 1.00 equivalent) was added dropwise. An exotherm was detected after 31.8% of the feed had been added. A dry ice/hexane cooling bath was applied to maintain the reaction temperature at 60°–65° C. The total feed time was one hundred five minutes. An exotherm was noted until the last drop of feed was added, then the temperature fell off rapidly to room temperature. The reaction mixture was stirred at room temperature for forty five minutes, then heated to 65° C. with a heating mantle. The heat source was removed. Isoprene, 36.45 grams (0.535 mole, 2.00 equivalents) was then added dropwise. An exotherm was noted after 24.6% of the feed had been added. Hexane cooling was applied to maintain the reaction temperature at 60°–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded an orange solution, yield=530 ml, 425.34 grams.

Total base=17.1 wt. %.
Active C-Li=15.9 wt %.
Yield (based on active C-Li)=80.8%.

Example 4

Preparation of 4-Methoxy-1-butyllithium Chain Extended with 2 Moles of Isoprene Lot 8984 (461-70)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×75 ml), and pentane (1×75 ml), then dried in a stream of argon. The dry dispersion, 6.30 grams (0.908 mole, 2.80 equivalents) was transferred to the flask with 250 ml cyclohexane. This suspension was stirred at 450 RPMs, and heated to 65° C. with a heating mantle. The heat source was removed. 4-Methoxy-1-chlorobutane, 39.71 grams (0.324 mole, 1.00 equivalent) was added dropwise. An exotherm was detected after 11.1% of the feed had been added. A dry ice/hexane cooling bath was applied to maintain the reaction temperature at 60°–65° C. The reaction mixture turned muddy brown about halfway through the feed. The total feed time was fifty minutes. An exotherm was noted until the last drop of feed was added, then the temperature fell off rapidly to room temperature. The reaction mixture was stirred at room temperature for sixty minutes, then heated to 62° C. with a heating mantle. The heat source was removed. Isoprene, 44.16 grams (0.648 mole, 2.00 equivalents) was then added dropwise. An exotherm was noted after 7.5% of the feed had been added. Hexane cooling was applied to maintain the reaction temperature at 60°–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×75 ml). This afforded a pale yellow, clear solution, yield=500 ml, 389.11 grams.
Total base=16.2 wt. %.
Active C-Li=15.5 wt %.
Yield (based on active C-Li)=80.9%.

Example 5

Polymerization of Isoprene using an Initiator Prepared by Chain Extension of 3-(1,1-Dimethylethoxy)-1-propyllithium with Isoprene (8985)

To a solution of 40.31 grams of isoprene dissolved in 400 ml of dry cyclohexane at 14.7° C. was added 33.39 g of a 17.3 weight per cent solution in cyclohexane of 3-(1,1-dimethylethoxy)-1-propyllithium, chain-extented with two moles of isoprene per mole of organolithium. The solution temperature rose to 15.9° C. during addition of the initiator. The solution was then heated to 51.2° C., and then the heat source withdrawn. The temperature rose on its own to 63.4° C. at which point a cooling bath was briefly applied to moderate the reaction temperature. After about one hour the temperature had dropped to 28.5° C. The reaction mixture was allowed to stand an additional 21 hours, after which it was quenched with 40 ml of anhydrous methanol. Hexane (100 ml) was added and the layers separated. The hydrocarbon layer was washed once again with 40 ml of methanol and then stripped of solvent under vacuum at 35° C. in a RotoVap unit to constant weight. A weight of 45.2 grams of a clear somewhat viscous, easily pourable oil was obtained (Theory=46.1 g)

Example 6

Polymerization of Isoprene using an Initiator Prepared by Chain Extension of 2,2-Dimethyl-3-(1,1-dimethylethoxy)-1-propyllithium with Isoprene (8986)

To a solution of 40.44 grams of isoprene dissolved in 400 ml (307.5 g) of cyclohexane at 19.6° C. was added 36.06 g of a 16.9 weight percent solution in cyclohexane of 2,2-dimethyl-3-(1,1-dimethylethoxy)-1-propyllithium, chain-extended with two moles of isoprene per mole of organolithium. The reactants were heated to 50° C. and reaction allowed to proceed on its own. When the temperature reached 64.1° C., the reaction mixture was cooled briefly. The reaction temperature gradually dropped to 43.1° C. after 24 minutes, and to 23.2° C. after a further 2 hours. The mixture was quenched with 40 ml of methanol after standing for 14 hours. Hexane (100 ml) was added, the layers were separated and the hydrocarbon layer washed once again with 40 ml of methanol, and then solvent-stripped under vacuum at 35° C. to constant weight. A weight of 46.4 grams of a clear, somewhat viscous oily polymer was obtained (Theory=46.44 g)

Example 7

Polymerization of Isoprene Using an Initiator Prepared by Chain Extension of 4-Methoxy-1-butyllithium with Isoprene (8999)

To a solution of 40.11 grams of isoprene dissolved in 400 ml of cyclohexane was added 31.50 gram of a 15.5 weight percent solution of 4-methoxy-1-butyllithium chain-extended with two moles of isoprene per mole of organolithium, in cyclohexane, at 20.8° C. The solution was heated to 53.6° C., where the reaction mixture continued to generate heat on its own, the temperature of the mass rising to 63.5° C. within 4 minutes. A cooling bath was applied for a few minutes, and the reaction then allowed to proceed on its own. After about another two hours, the reaction temperature had dropped to 22° C. After standing overnight, the orange solution was quenched with 40 ml of methanol and 100 ml hexane. The hydrocarbon layer was separated and washed with another 40 ml of methanol, then stripped of solvent under vacuum. A weight of 45.8 grams of bright yellow fluid polymer was obtained.

Example 8

Polymerization of Isoprene using an Initiator Prepared by Chain Extension of 3-(t-Butyldimethylsilyloxy)-1-propyllithium with Isoprene (9006)

To a solution of 40.09 grams of isoprene dissolved in 400 ml of dry cyclohexane was added 40.55 grams of a 15.9 weight percent solution of 3-(t-butyldimethylsilyloxy)-1-propyllithium chain-extended with two moles of isoprene per mole of organollithium in cyclohexane. The solution was stirred and heated to 51.3° C., at which point the temperature continued to rise on its own, reaching 68.1° C. before a cooling bath was applied. After about 2 hours, the reactants had cooled to 22.4° C. and the reaction mixture was allowed to stand overnight. 100 ml of hexane and 40 ml of methanol were added and the mixture stirred for one hour. The hydrocarbon layer was separated, washed again with 40 ml of methanol, and stripped of solvent under vacuum. A weight of 48.2 grams of liquid polymer was recovered.

Example 9

Polymerization of Butadiene Using an Initiator Prepared by Chain Extension of 3-(1,1-Dimethylethoxy)-1-Propyllithium with Isoprene (9036)

To a solution of 42.0 grams of butadiene dissolved in 312 grams of cyclohexane at 3.3° C. was added 3.82 grams of a 17.3 weight percent solution in cyclohexane of 3-(dimethylethoxy))-1-propyllithium chain-extended with two moles of isoprene per mole of organolithium. The mixture was heated to 35.4° C. at which point refluxing of the butadiene was noted. The reaction proceeded slowly, the temperature gradually rising to 40° C. at which point the heat was cut off. The temperature gradually rose on its own to 43° C., then was heated still further to 52.3° C.(total heating time was about 1.5 hours). After standing for 16 hours at room temperature the mixture was treated with 100 ml of hexane and 40 ml of methanol for one hour. The layers were separated and the upper hydrocarbon layer washed again with 40 ml of methanol. The hydrocarbon layer was stripped of solvent under vacuum at 35° C. to yield 43 grams of a light yellow, clear slightly viscous fluid.

What is claimed is:

1. A process for the preparation of hydrocarbon solutions of monofunctional ether initiators comprising reacting a monofunctional ether of the following structure:

$$M-Z-O-A(R^1R^2R^3) \qquad (I)$$

wherein M is an alkali metal selected from the group consisting of lithium, sodium and potassium; Z is a branched or straight chain hydrocarbon group with contains 3–25 carbon atoms, optionally containing aryl or substituted aryl groups containing lower alkyl, lower alkylthio or lower dialkylamino groups; A is an element selected from carbon and silicon; and $R^1$, $R^2$, and $R^3$ are independently selected from hydrogen, alkyl, substituted alkyl groups containing lower alkyl, lower alkylthio or lower dialkylamino groups; aryl, or substituted aryl groups containing lower alkyl, lower alkylthio or lower dialkylamino groups, the monofunctional ether of formula (I) resulting from reacting an omega-protected-1-haloalkyl with an alkali metal having a particle size between 10 and 300 microns in size, at a temperature between 35° and 130° C. in an alkane or cycloalkane solvent containing 5 to 10 carbon atoms to form an intermediate alkali metal-containing monofunctional ether product of formula (I), with a compound selected from the group consisting of conjugated diene hydrocarbons and alkenyl substituted aromatic hydrocarbons to produce a compound having the following structure:

$$M-Q_n-Z-OA(R^1R^2R^3) \qquad (II)$$

wherein M is a alkali metal selected from the group consisting of lithium, sodium and potassium, Q is a saturated or unsaturated hydrocarbyl group produced by the reaction of a compound selected from the group consisting of conjugated diene hydrocarbons and alkenyl substituted aromatic hydrocarbons containing 4–25 carbon atoms with the monofunctional ether of formula (I); Z is defined as a branched or straight chain hydrocarbon connecting group which contains 3–25 carbon atoms, optionally containing aryl or substituted aryl groups containing lower alkyl, lower alkylthio or lower dialkylamino groups; A is an element selected from the group consisting of carbon and silicon; $R^1$, $R^2$, and $R^3$ are independently selected from hydrogen, alkyl, substituted alkyl groups containing lower alkyl, lower alkylthio or lower dialkylamino groups; aryl or substituted aryl groups containing lower alkyl, lower alkylthio or lower dialkylamino groups, and n is an integer from 1–5.

2. The process of claim 1 wherein the reaction temperature is the reflux temperature of the solvent.

3. The process of claim 1 wherein the omega-protected-1-haloalkane is selected from 3-(1,1-dimethylethoxy)-1-propylhalide, 3-(1,1-dimethylpropoxy)-1-propylhalide, 4-(methoxy)-1-butylhalide, 3-(triphenylmethoxy)-1-propylhalide, 5-(triphenylmethoxy)-1-pentylhalide, 6-(triphenylmethoxy)-1-hexylhalide, 8-(triphenylmethoxy)-1-octylhalide 3-(1,1-dimethylethoxy)-2-methyl-1-propylhalide, 3-[3-(dimethylamino)-1-propyloxy]-1-propylhalide, 3-[2-(dimethylamino)-1-ethoxy]-1-propylhalide, 3-[2-(diethylamino)-1-ethoxy]-1-propylhalide, 3-[2-(diisopropyl)amino]-1-ethoxy]-1-propylhalide, 3-[2-(1-piperidino)-1-ethoxy]-1-propylhalide, 3-[2-(1-pyrrolidino)-1-ethoxy]-1-propylhalide, 4-[3-(dimethylamino)-1-propyloxy]-1-butylhalide, 6-[2-(1-piperidino)-1-ethoxy]-1-hexylhalide 3-[2-(methoxy)-1-ethoxy]-1-propylhalide, 3-[2-(ethoxy)-1-ethoxy]-1-propylhalide, 4-[2-(methoxy)-1-ethoxy]-1-butylhalide, 5-[2-(ethoxy)-1-ethoxy]-1-pentylhalide, 3-[3-(methylthio)-1-propyloxy]-1propylhalide, 3-[4-(methylthio)-1-butyloxy]-1-propylhalide, 3-(methylthiomethoxy)-1-propylhalide, 6-[3-(methylthio)-1-propyloxy]-1-hexylhalide, 3-[4-(methoxy)-benzyloxy]-1-propylhalide, 3-[4-(1,1-dimethylethoxy)-benzyloxy]-1-propylhalide, 3-[2,4-(dimethoxy)-benzyloxy]-1propylhalide, 8-[4-(methoxy)-benzyloxy]-1-octylhalide, 4-[4-(methylthio)-benzyloxy]-1-butylhalide, 3-[4-(dimethylamino)-benzyloxy]-1-propylhalide, 6-[4-(dimethylamino)-benzyloxy]-1-hexylhalide, 3-(1,1-dimethylethoxy)-2,2-dimethyl-1-propylhalide, 6-(t-butyldimethylsilyloxy)-1-hexylhalide, 3-(t-butyldimethylsilyloxy)-2,2-dimethyl-1-propylhalide; 3-(t-butyldimethylsilyloxy)-1-propylhalide; 4-(t-butyldimethylsilyloxy)-1-butylhalide and 3-(trimethylsilyloxy)-2,2-dimethyl-1-propylhalide.

4. The process of claim 3 characterized in that the halide is selected from the group consisting of bromine and chlorine.

5. The process of claim 1 wherein the alkali metal is lithium.

6. The process of claim 5 wherein the lithium metal contains 0.2 to 0.8 weight percent sodium.

7. The process of claim 5 wherein the lithium metal contains 0.3 to 0.5 weight percent sodium.

8. The process of claim 1 wherein the conjugated diene hydrocarbon is selected from the group consisting of 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 1,3-hexadiene, 2,5-dimethyl-2,4-hexadiene and 1,3-octadiene.

9. The process of claim 1 wherein the alkenylsubstituted aromatic hydrocarbon is selected from alpha-methylstyrene, styrene, vinyltoluene, 1-vinylnaphthalene, 2-vinylnaphthalene, 1-alpha-methylvinylnaphthalene, 2-alpha-methylvinylnaphathalene, 1,2-diphenyl-4-methylhexene-1 and 1,1-diphenylethylene.

10. The process of claim 1 wherein the conjugated diene hydrocarbon is butadiene and isoprene.

11. A monofunctional ether anionic polymerization initiator comprising a compound of the formula:

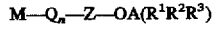

$$M-Q_n-Z-OA(R^1R^2R^3)$$

wherein M is an alkali metal, Q is an unsaturated hydrocarbyl group derived by incorporation of a conjugated diene hydrocarbon or a saturated hydrocarbyl group derived by incorporation of an alkenyl substituted aromatic hydrocarbon; Z is a branched or straight chain hydrocarbon group which contains 3–25 carbon atoms, optionally containing aryl or substituted aryl groups containing lower alkyl, lower alkylthio or lower dialkylamino groups; A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and n is an integer from 1 to 5.

12. The compound of claim 11 where in the alkali metal is selected from the group consisting of lithium, sodium and potassium.

13. The compound of claim 11 where in the alkali metal is selected from the group consisting of lithium and sodium.

14. The compound of claim 11 where in the branched or straight chain hydrocarbon tether group contains 3 to 8 carbon atoms.

15. The compound of claim 11 wherein the alkali metal is lithium.

16. The compound of claim 15 wherein the lithium metal contains 0.21 to 0.8 weight percent sodium.

17. The compound of claim 15 wherein the lithium metal contains 0.3 to 0.5 weight percent sodium.

18. A process for the anionic polymerization of olefinic-containing monomers comprising the steps of:
   a) initiating polymerization of a conjugated polyene hydrocarbon having 4 to 30 carbon atoms or a vinyl-substituted aromatic hydrocarbon in a hydrocarbon or mixed hydrocarbon-polar solvent medium at a temperature of 10° C. to 70° C. with an initiator having the formula:

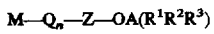

wherein M is an alkali metal, Q is a saturated or unsaturated hydrocarbyl group derived by incorporation of a compound selected from the group consisting of conjugated diene hydrocarbons and alkenyl substituted aromatic hydrocarbons; Z is a branched or straight chain hydrocarbon group which contains 3–25 carbons atoms, optionally containing aryl or substituted aryl groups containing lower alkyl, lower alkylthio or lower dialkylamino groups; A is an element selected from carbon and silicon $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower, alkylthio, and lower dialkylamino groups, and n is an integer from 1 to 5, to produce an intermediate polymer; and
   b) reacting the intermediate polymer with a functionalizing compound to produce a functionalized polymer
   c) optionally hydrogenating the functionalized polymer
   d) further reacting the functionalized polymer with other comonomers in the presence of a strong acid catalyst to simultaneously deprotect the polymer and polymerize the comonomers at both functional sites or
   e) further reacting the functionalized polymer with comonomers in the absence of strong acid catalysts, then deprotecting the resultant copolymer, and
   f) further reacting the resultant copolymer with the same or other comonomers.

19. The process of claim 18 wherein the functionalizing compound is selected from the group consisting of oxygen, sulfur, ethylene oxide, carbon dioxide, omega-alkenylarylhalosilanes, chlorosilanes, and chlorostannanes prior to recovering the polymer.

20. The process of claim 18 wherein the conjugated polyene hydrocarbon is a conjugated diene hydrocarbon selected from the group consisting of 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 1,3-hexadiene, 2,5-dimethyl-2,4-hexadiene, and 1,3-octadiene.

21. The process of claim 18 further comprising the step of hydrogenating the polymerized conjugated polyene hydrocarbon.

22. The process of claim 18 wherein the intermediate polymer is reacted with isomeric divinylbenzenes and deprotected to yield star-branched polymers with hydroxy-terminated branches.

23. The process of claim 22 wherein the star-branched polymers are hydrogenated.

24. The process of claim 23 wherein the polymers are further reacted with ethylene oxide and potassium t-butoxide to produce hydrogels.

25. The process of claim 23 wherein the polymers are reacted with acryloyl chloride and methacryloyl chloride.

26. The process of claim 25 wherein the products of the reaction are further reacted with alkyl acrylates, alkyl methacrylates, and dialkyl acrylamides to produce hydrogels.

27. The process of claim 18 wherein the functionalizing compound is ethylene oxide, the functionalized polymer is hydrogenated, and the comonomers are selected from the group of epichlorohydrin and diisocyanates to produce epoxide and isocyanate-terminated polymers.

28. The process of claim 27 further characterized by simultaneous deprotection and polymerization of the isocyanate and epoxy-terminated polymers.

29. The process of claim 18 wherein the functionalizing compound is ethylene oxide and the comonomers are selected from the group of dialkylterephthalates, alpha, omega-alkane diols, caprolactam and adipic acid, and the deprotection is carried out simultaneously with polymerization.

30. The process of claim 18 wherein the functionalizing compound is ethylene oxide, the comonomer is ethylene oxide, the polymerization is carried out in the presence of potassium tert-butoxide, the resulting copolymer is deprotected and reaction with the comonomer continued.

31. The process of claim 18 wherein the functionalizing compound is ethylene oxide, the functional polymer is hydrogenated and reacted with a diisocyanate in a 2:1 ratio, further reacted with hydroxyethylacrylate in the presence of a basic catalyst, and deprotected to yield a macromonomer.

32. The process of claim 18 wherein the functionalizing compound is styrenyldimethylchlorosilane.

33. A functionalized polymer produced by a process comprising the steps of:
   a) initiating polymerization of a conjugated polyene hydrocarbon having 4 to 30 carbons atoms or a vinyl-substituted aromatic hydrocarbon in a hydrocarbon or mixed hydrocarbon-polar solvent medium at a temperature of 10° C. to 70° C. with an initiator having the formula:

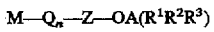

wherein M is an alkali metal, Q is a saturated or unsaturated hydrocarbyl group derived by incorporation of a compound selected from the group consisting of conjugated diene hydrocarbons and alkenylsubstituted aromatic hydrocarbons; Z is a branched or straight chain hydrocarbon group which contains 3–25 carbon atoms, optionally containing aryl or substituted aryl groups containing lower alkyl, lower alkylthio or lower dialkylamino groups, A is an element selected from carbon and silicon $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and n is an integer from 1 to 5;

b) reacting the intermediate polymer with a functionalizing compound, c) optionally hydrogenating the polymer, d) further reacting the functionalized polymer with other comonomers in the presence of a strong acid to simultaneously deprotect and polymerize the functionalized polymer at both functional sites or e) further reacting the functionalized polymer with comonomers in the absence of a strong acid catalyst, followed by deprotection and further reaction with the same or other comonomers.

34. The polymer of claim 33 wherein the functionalizing compound is selected from the group of ethylene oxide, oxygen, sulfur, carbon dioxide, omega-alkenylarylhalosilanes, chlorosilanes, and chlorostannanes.

35. The process of claim 33 wherein the conjugated polyene hydrocarbon is a conjugated diene hydrocarbon selected from the group consisting of 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 1,3-hexadiene, 2,5-dimethyl-2,4hexadiene, and 1,3-octadiene.

36. The polymer of claim 33 further comprising the step of hydrogenating the polymerized conjugated polyene hydrocarbon.

37. The polymer produced by the process of claim 22.
38. The polymer produced by the process of claim 23.
39. The polymer produced by the process of claim 24.
40. The polymer produced by the process of claim 25.
41. The polymer produced by the process of claim 26.
42. The polymer produced by the process of claim 27.
43. The polymer produced by the process of claim 28.
44. The polymer produced by the process of claim 29.
45. The polymer produced by the process of claim 30.
46. The polymer produced by the process of claim 31.
47. The polymer produced by the process of claim 32.

* * * * *

UNITED STATES PATENT AND TRADEMARK OFFICE
CERTIFICATE OF CORRECTION

PATENT NO. : 5,708,092

DATED : January 13, 1998

INVENTOR(S) : Schwindeman et al.

It is certified that error appears in the above-identified patent and that said Letters Patent is hereby corrected as shown below:

On the cover page, under Related U.S. Application Data, serial no. "245,578" should be -- 242,518 --.

Signed and Sealed this

Twenty-first Day of April, 1998

*Attest:*

BRUCE LEHMAN

*Attesting Officer*  *Commissioner of Patents and Trademarks*